UNITED STATES PATENT OFFICE.

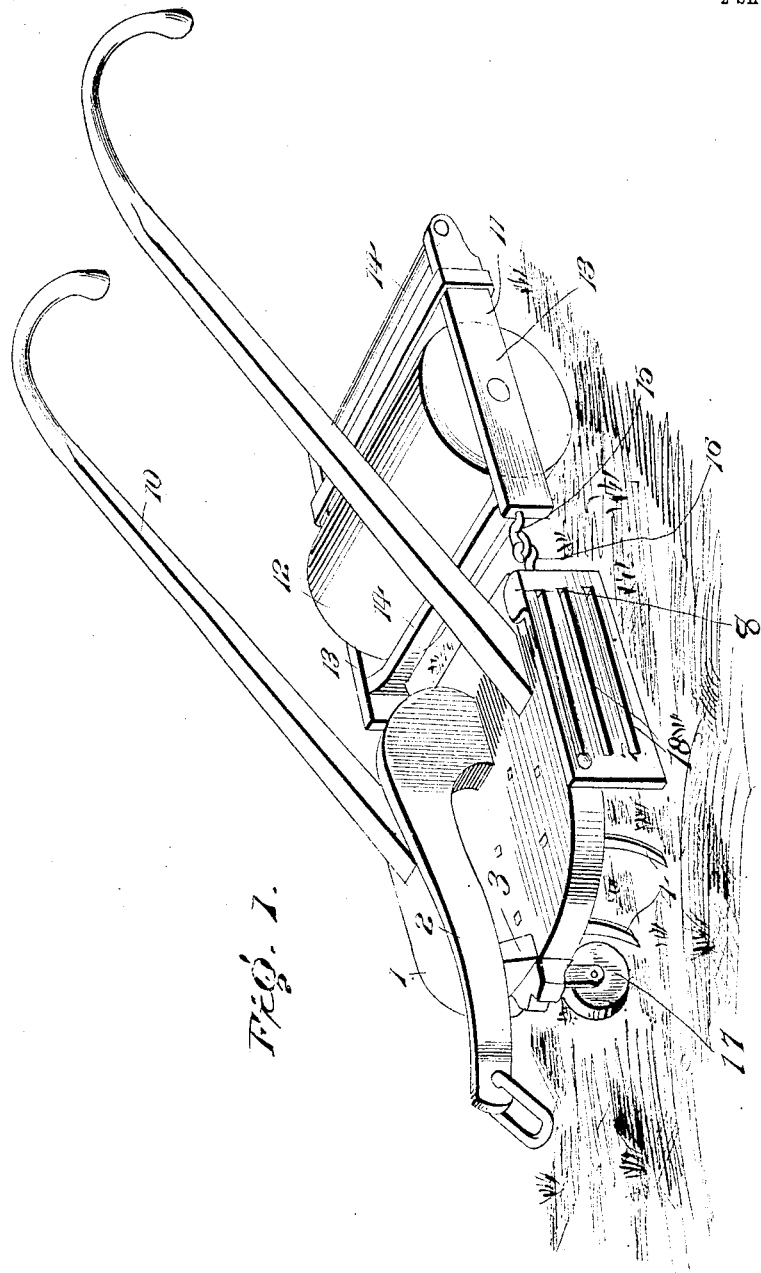

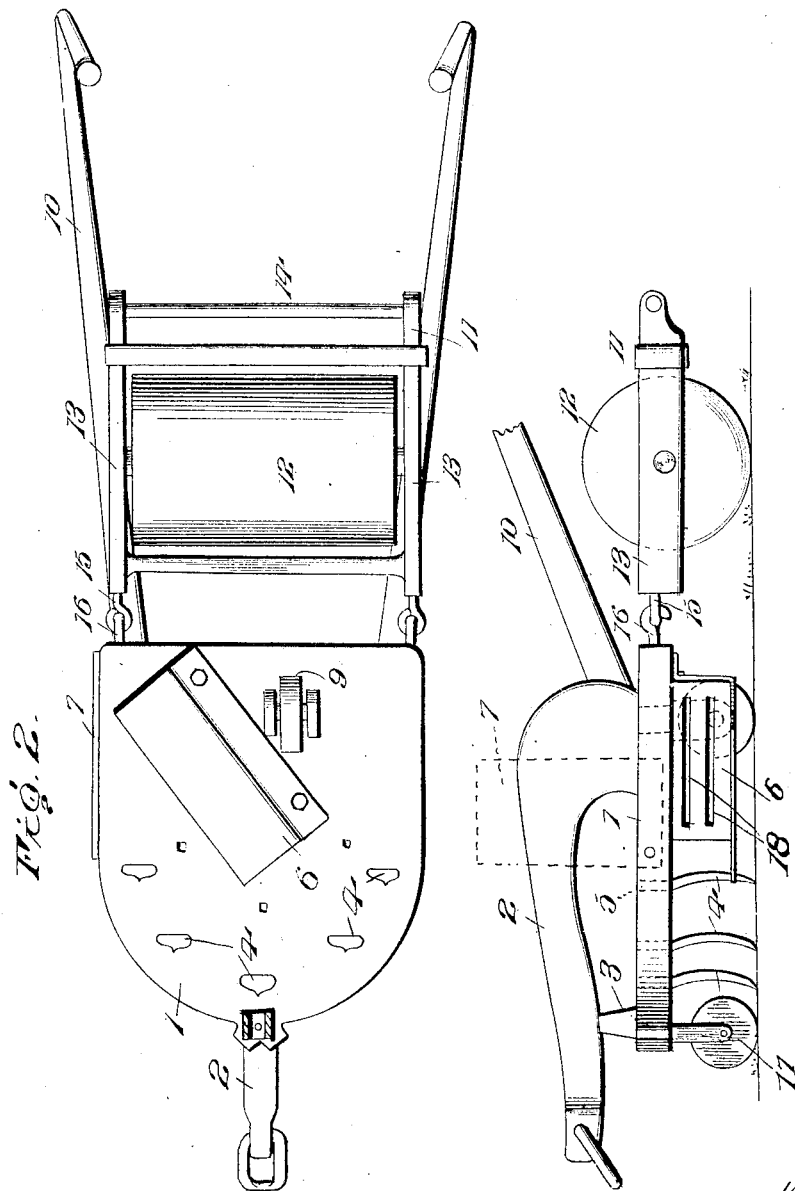

WILSON H. DANIEL, OF JASPER, INDIANA.

CULTIVATOR.

No. 869,481.  Specification of Letters Patent.  Patented Oct. 29, 1907.

Application filed March 2, 1907. Serial No. 360,157.

*To all whom it may concern:*

Be it known that I, WILSON H. DANIEL, a citizen of the United States, residing at Jasper, in the county of Dubois and State of Indiana, have invented certain new and useful Improvements in Cultivators, of which the following is a specification.

The present invention relates in general to agricultural implements and more particular to a novel form of cultivator, the object of the invention being to provide a simple and efficient implement of this character which is peculiarly designed so as to loosen the earth, skim the surface of the ground to remove all weeds or other obnoxious growths, deposit the surface soil in a ridge at the root of the plants, and compact the earth so as to prevent rapid evaporation of moisture therefrom.

For a full description of the invention and the merits thereof and also to acquire a knowledge of the details of construction and the means for effecting the result, reference is to be had to the following description and accompanying drawings, in which:

Figure 1 is a perspective view of a cultivator constructed in accordance with the present invention. Fig. 2 is a bottom plan view of the same. Fig. 3 is a side elevation, a portion of the handles being removed.

Corresponding and like parts are referred to in the following description and indicated in all the views of the drawings by the same reference characters.

The numeral 1 designates the body portion of the implement which has a flattened formation and has the draft beam 2 applied to the upper face thereof, the rear end of the draft beam being extended downwardly and secured directly to the body portion, while the intermediate portion of the draft beam is connected to the forward end of the body portion through the medium of a block 3. Removably mounted upon the lower face of the body portion 1 are a series of cultivator teeth 4 which extend transversely across the forward portion of the body and have a V arrangement. In attaching the teeth 4 to the body 1 it will be observed that the latter is formed with a series of openings designed to receive the shanks 5 at the upper end portion of the teeth. Owing to this construction the teeth can be readily removed and different types of teeth are designed to be employed with different characters of soil. A scraper 6 is attached to the lower face of the body portion 1 in the rear of the cultivator teeth 4 and comprises an approximately horizontal member designed to skim the surface of the ground and remove all weeds and other obnoxious growths therefrom, and a vertical portion which owing to the diagonal arrangement of the scraper tends to throw the earth toward one side of the body portion 1. Adjustably mounted upon one side of the body 1 is a fender 7 which coöperates with the scraper 6 to deposit the earth collected by the said scraper in a ridge at the root of the plants. In the present instance this fender 7 is pivotally connected to an edge of the body 1 and is provided with an outwardly extended flange 8 which engages with the top of the body portion 1 to limit the downward swing of the fender and normally holds the same in operative position. When desired however the fender can be swung upwardly into an inoperative position as indicated in Fig. 3. It is also within the province of the invention to employ a caster wheel such as that indicated at 9 in connection with the body portion, the said caster wheel being shown in the present instance as located immediately in the rear of the scraper 6. Projecting upwardly and rearwardly from the body portion 1 are the handles 10 which may be of any approved type.

Trailing behind the body portion 1 is a frame 11 having a roller 12 journaled therein, the said roller being designed to compact the surface of the earth and thereby prevent the rapid evaporation of moisture therefrom which would otherwise take place. In the specific construction of the frame 11 it will be observed that the same comprises two side pieces 13 connected by the cross bars 14 arranged upon opposite sides of the roller 12, the forward end of each of the side pieces being provided with an eye 15 designed to detachably engage a corresponding hook member 16 upon the rear edge of the body portion 1. It will thus be apparent that the said frame has a pivotal connection with the body portion which enables it to swing upon a horizontal axis and that the roller 12 bears upon the surface of the ground with the same pressure regardless of the depth to which the cultivator teeth may penetrate the same.

If found desirable a second caster wheel 17 may be secured to the forward portion of the body of the cultivator as shown in the drawings. Under some circumstances it may be found desirable to provide the fender 7 with a series of perforations through which the fine earth can pass, and in the present instance these perforations are in the nature of longitudinally disposed slits 18.

Having thus described the invention, what is claimed as new is:

1. In a cultivator, the combination of a body, cultivator shovels carried by the body for loosening the earth, a diagonal scraper blade carried by the body in the rear of the cultivator shovels to deflect the surface earth toward one side of the body, and a fender attached to one side of the body and coöperating with the scraper to deposit the earth in a ridge.

2. In a cultivator, the combination of a body, cultivator shovels carried by the body for loosening the earth, a diagonal scraper blade mounted upon the body in the rear of the cultivator shovels, the said scraper blade comprising a horizontal portion skimming the earth, and a vertical portion deflecting the earth toward one side of the body, and a fender mounted upon one side of the body and coöperating with the scraper blade to deposit the earth deflected thereby in a ridge.

3. In a cultivator, the combination of a body having a flattened formation, cultivator shovels carried by the body for loosening the earth, a diagonal scraper blade mounted upon the body in the rear of the cultivator shovels to deflect the earth toward one side of the body, and a fender pivotally mounted upon one side of the body and designed to coöperate with the scraper to deposit the earth deflected thereby in a ridge, the said fender being adapted to be swung upwardly into an inoperative position.

4. In a cultivator, the combination of a body having a flattened formation, a draft beam having the rear end thereof extended downwardly and secured to the body, a block interposed between the forward portion of the body and the draft beam, cultivator shovels carried by the body, a diagonal scraper blade mounted upon the body for deflecting the earth loosened by the cultivator shovels, and a fender mounted upon the body and coöperating with the scraper to deposit the earth deflected thereby in a ridge.

In testimony whereof I affix my signature in presence of two witnesses.

WILSON H. DANIEL. [L. S.]

Witnesses:
JOHN E. McFALL,
JOHN L. BRETZ.